US012647435B2

(12) United States Patent
Akhtar

(10) Patent No.: US 12,647,435 B2
(45) Date of Patent: Jun. 2, 2026

(54) DETECTION OF USER ANOMALIES FOR SOFTWARE AS A SERVICE APPLICATION TRAFFIC WITH HIGH AND LOW VARIANCE FEATURE MODELING

(71) Applicant: Palo Alto Networks, Inc., Santa Clara, CA (US)

(72) Inventor: Muhammad Aurangzeb Akhtar, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 580 days.

(21) Appl. No.: 17/660,164

(22) Filed: Apr. 21, 2022

(65) Prior Publication Data

US 2023/0344842 A1 Oct. 26, 2023

(51) Int. Cl.
*H04L 9/40* (2022.01)

(52) U.S. Cl.
CPC ...... *H04L 63/1425* (2013.01); *H04L 63/1433* (2013.01)

(58) Field of Classification Search
None
See application file for complete search history.

(56) References Cited

U.S. PATENT DOCUMENTS

| 11,706,234 | B2 * | 7/2023 | Saunders | ............ | H04L 63/1425 |
| | | | | | 370/242 |
| 2016/0050224 | A1 * | 2/2016 | Ricafort | .............. | H04L 63/1425 |
| | | | | | 726/23 |
| 2017/0185758 | A1 * | 6/2017 | Oliker | ................... | G06F 21/316 |
| 2017/0345268 | A1 * | 11/2017 | Cho | ................. | G08B 13/19673 |
| 2018/0322004 | A1 * | 11/2018 | Jain | ..................... | G06F 11/3476 |
| 2019/0286242 | A1 * | 9/2019 | Ionescu | ................. | G06N 3/084 |
| 2021/0049413 | A1 * | 2/2021 | Ma | .......................... | G06F 21/53 |
| 2021/0119941 | A1 * | 4/2021 | Hoole | ................. | H04L 47/2441 |

OTHER PUBLICATIONS

Moon et. al. "An ensemble approach to anomaly detection using high- and low-variance principal components", Computers and Electrical Engineering 99 (2022) 107773, Available online Feb. 15, 2022. (Year: 2022).*

Kind, et al., "Histogram-Based Traffic Anomaly Detection", IEEE Transactions on Network and Service Management, vol. 6, No. 2, pp. 110-121, Jun. 2009.

Ringberg, et al., "Sensitivity of PCA for Traffic Anomaly Detection", ACM Sigmetrics Performance Evaluation Review, vol. 35, Issue 1, pp. 109-120, Jun. 2007.

* cited by examiner

*Primary Examiner* — Bassam A Noaman
(74) *Attorney, Agent, or Firm* — Gilliam IP PLLC

(57) ABSTRACT

Low variance clustering models and high variance clustering models comprising low and high variance features of user Software as a Service application traffic detect anomalous user behavior and, when risk thresholds are exceeded, trigger behavioral alerts. The low and high variance clustering models are trained with feature vectors that are dimension reduced using principal component analysis and clusters therein are classified as normal, benign, or malicious. Models are trained repeatedly in a sliding time window of training data to detect recent and potentially malicious user behavior. Behavioral alerts are triggered according to criterion specific to each of the low and high variance clustering models that account for increased risk associated with anomalous changes in low variance features.

20 Claims, 6 Drawing Sheets

DETECTION OF USER ANOMALIES FOR SOFTWARE AS A SERVICE APPLICATION TRAFFIC WITH HIGH AND LOW VARIANCE FEATURE MODELING

BACKGROUND

The disclosure generally relates to machine learning (e.g., CPC G06N/20) and network monitoring for security (e.g., CPC H04L 9/00).

User behavioral profiling is a component of network security to prevent malicious access to software as a service ("SaaS") applications. Various security products monitor user cloud access and determine baseline user behaviors to be able to track anomalies that could indicate malicious attackers. Machine learning modeling enables detection of statistical outliers that deviate sufficiently far from baseline user behaviors to trigger an alert.

BRIEF DESCRIPTION OF THE DRAWINGS

Aspects of the disclosure may be better understood by referencing the accompanying drawings.

DESCRIPTION

Figure 1:
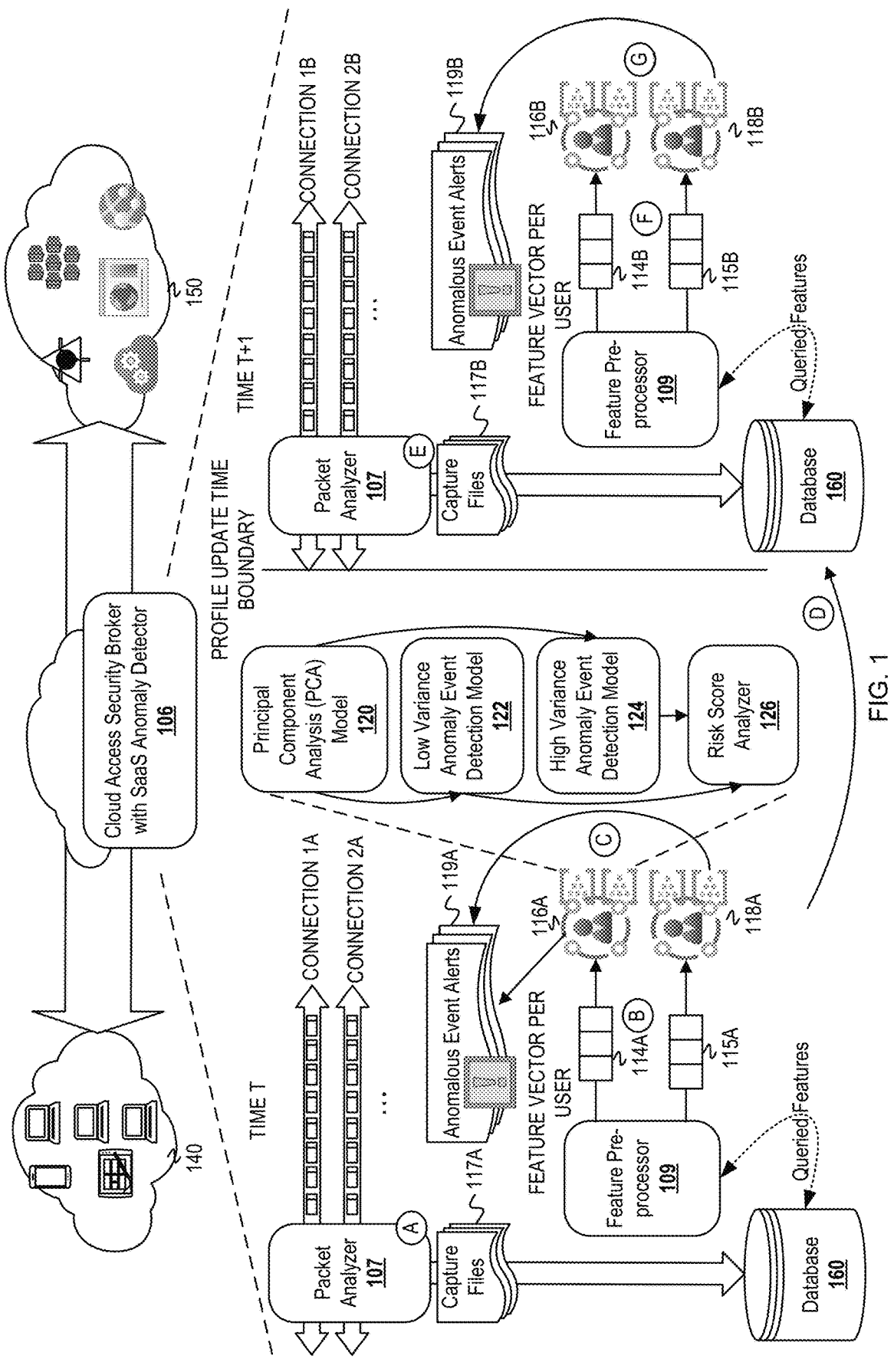
FIG. 1 is a schematic diagram of an anomaly detector identifying anomalous application usage events with user behavioral profiles integrating high and low variance models.

The description that follows includes example systems, methods, techniques, and program flows that embody aspects of the disclosure. However, it is understood that this disclosure may be practiced without these specific details. For instance, this disclosure refers to anomaly detection in network traffic using principal component analysis (PCA) and clustering in illustrative examples. Aspects of this disclosure can be instead applied to any machine learning model for anomaly detection in network traffic. Also, this description refers to Software as a Service, but the disclosed technology can also be applied to other services including Platform as a Service and Infrastructure-as-a-Service. In other instances, well-known instruction instances, protocols, structures and techniques have not been shown in detail in order not to obfuscate the description.

Overview

A software as a service (SaaS) anomaly detector disclosed herein generates user behavioral profiles for SaaS traffic by clustering high and low variance features. The SaaS anomaly detector obtains network traffic data (e.g., traffic logs and/or firewall logs) to extract information relating to SaaS behavior. The SaaS anomaly detector preprocesses the network traffic data to generate features that are reduced using principal component analysis ("PCA"). The SaaS anomaly detector ("anomaly detector") includes or uses a high variance clustering model and a low variance clustering model. The dimension-reduced features are input into either the high variance or low variance clustering model depending on the variance of the corresponding feature. The anomaly detector classifies the features as normal, benign, or anomalous/malicious and applies risk score criteria that, when satisfied, trigger an alert. The risk criteria are tuned so that low variance feature anomalies have a higher impact on triggering an alert due to the expectation that these low variance features don't typically exhibit anomalous behavior. The high and low variance clustering models are repeatedly trained using a sliding window of network traffic data according to a schedule to generate updated behavioral profiles. The use of high and low variance models reduces false positives by implementing criteria (e.g., a risk score) for triggering alerts, and the repeated model updates ensure up-to-date user protection from zero-day anomalous behavior.

Terminology

The term "behavior" as used herein refers to actions taken by an actor (e.g., a user) on one or more endpoint devices. Behavior is tracked over time using profiles that model baselines for user behavior corresponding to typical/common actions taken by the user. An action comprises any usage of the endpoint device including running native processes, accessing the internet, using SaaS applications, etc.

The term "SaaS usage behavior" as used herein refers to behavior specific to the use of SaaS applications. This includes outgoing network traffic from endpoint devices as a result of user SaaS application usage on one or more endpoints. Examples herein analyze network traffic to monitor SaaS usage behavior.

The term "event log" refers to a log of data corresponding to events. For example, an event log can be created with data extracted from protocol data units (PDUs) as well as any other data logged by a firewall. In addition to event data, event logs can include event metadata which, for example, describe the association of packets for an event.

Example Illustrations

FIG. 1 is a schematic diagram of an anomaly detector identifying anomalous application usage events with user behavioral profiles integrating high and low variance models. A cloud access security broker with SaaS anomaly detector 106 (hereinafter "anomaly detector 106" for brevity) inspects packets of traffic communicated between various endpoint devices 140 and services on the world wide web 150. The anomaly detector 106 processes per-user features for packets to develop behavioral profiles. These behavioral profiles are then used to identify anomalous events using high and low variance detection models and risk score analysis. Two iterations of live packet analysis occur in FIG. 1 in time interval t and time interval t+1, illustratively separated by a profile update time boundary. Each time interval represents the lifespan of current behavioral profiles before the profiles are updated using data accumulated over the most recent and historical time intervals. The anomaly detector 106 includes or communicates with a packet analyzer 107 which extracts capture files 117A observed from in-transit packets and stores the capture files 117A in a database 160. The SaaS anomaly detector, which is presented as a component of the cloud access security broker 106 in this example illustration, includes a feature pre-processor 109 and changing models for user anomaly detection depicted as behavioral profiles 116A and 118A in time interval t and depicted as behavioral profiles 116B and 118B in time interval t+1.

FIG. 1 is annotated with a series of letters A-G. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the packet analyzer 107 records data from packets communicated across various sessions and/or flows during time interval t such as connection 1A and connection 2A. As packets are processed by the packet analyzer 107, the packet analyzer generates capture files 117A. The generation of capture files 117A occurs inline as packets are communicated between the endpoint devices 140 and the nodes on the world wide web 150, minimizing latency for SaaS applications. The packet analyzer 107 extracts information that includes protocol information such as source Internet Protocol ("IP") address, source port, destination IP address, destination port, file name, file type, etc. Once stored, the database 160 sorts capture files 117A by user and/or associated organizations using, in an embodiment, user identifiers extracted from packets. The anomaly detector 106 can be an anomaly detector within a larger firewall framework that performs comprehensive threat analysis on capture files 117A stored in the database 160. The database 160 can comprise various metrics, features, indicators, etc. generated by a firewall using intercepted information within each capture file 117A. Moreover, the database 160 can track events across time intervals (e.g., user access to SaaS applications for last hour, day, week, etc.) and can support intelligent queries by the anomaly detector 106 for events occurring at distinct time intervals. The anomaly detector 106 can maintain multiple behavioral profiles for each user that track events at different time frames, e.g., one behavioral profile for events corresponding to individual packets, one behavioral profile for events occurring over the last hour, over the last day etc.

At stage B, the feature pre-processor 109 uses features queried from the database 160 to generate per-user feature vectors 114A and 115A. Each per-user feature vector 114A, 115A comprises high variance features that have high variability over time for each user and typically represent raw or mildly processed data and low variance features that have low variability over time. For instance, high variance features include a number of SaaS applications that a user accesses, time stamps of each user access, duration between first and last access for each application, number of user logins, number of user logouts, number of user sessions, and any of the aforementioned packet header fields extracted by the packet analyzer 107. Low variance features are features that typically stay constant or infrequently vary across a time interval so that a change in such features results in a large increase of user risk score and in some instances automatically triggers a behavioral alert. Such low variance features can include a type of operating system, an average number of high-risk SaaS applications used in an interval, geographical location of user access, machine name or user agent, sanctioned application user, internet service provider (ISP), etc. The anomaly detector 160 can query the database 160 with specific event types and corresponding time intervals for each feature, e.g., user traffic volume for a SaaS application over the past hour.

The delineation between high and low variance features can be tracked by the anomaly detector 106 over time. The anomaly detector 106 can log running statistics of each feature (e.g., mean, variance, variance over rolling time window, etc.) to verify that each feature still demonstrates characteristics of its respective variance classification, and if features start to deviate per-user or across multiple users, the anomaly detector 106 can reclassify certain features as low or high variance. The feature pre-processor 109 can normalize features to be numerical values, have consistent statistics (e.g., mean zero variance one), and other preprocessing steps that format features for inputting to the behavioral profiles 116A and 118A. The feature pre-processor 109 communicates per-user feature vectors 114A, 115A to behavioral profiles 116A, 118A, respectively for evaluation of anomalous events.

At stage C, behavioral profiles 116A and 118A receive per-user feature vectors 114A, 115A respectively that correspond to users for which each profile is trained. The behavioral profile 116A comprises a PCA model 120, a low variance anomaly event detection model 122, a high variance anomaly event detection model 124, and a risk score analyzer 126. The per-user feature vectors 114A and 115A each comprise a low variance feature sub-vector and a high variance feature sub-vector that are input into the low variance anomaly event detection model 122 and the high variance anomaly event detection model, respectively. The feature pre-processor 109 can be configured to automatically store low and high variance features as separate sub-vectors of the user feature vectors 114A and 115A, for instance by indicating feature classification (high, low variance) as a hyperparameter in feature generating functions. In addition to this ensemble of anomaly detection models, the behavioral profiles 116A and 118A further comprise stored baseline statistics for features used in the model ensemble for anomaly detection. These baseline statistics are used to classify feature clusters and to classify features as high or low variance. Based on feature classification as high or low variance using the baseline statistics, anomaly detection models such as the low variance anomaly event detection model 122 and the high variance anomaly event detection model 124 are updated during training to receive newly classified low and high variance features, respectively, as inputs.

The PCA model 120 receives both high and low variance features from the per-user feature vector 114A, and separately reduces the dimension of the high and low variance features. For instance, when the sub-vector of low variance features can be represented as $$x = \{x_i\}_{i=1}^n,$$

where each $x_i$ is a numerical feature and n is the number of features, then to reduce to a m-dimensional vector where m<n, the PCA model 120 applies a pre-trained linear transformation t=xW, where W is a n by m matrix, so that the resulting transformed vector t has dimension m. In practice, m can be small (e.g., 2 or 3) and can depend on observed statistics when training the W matrix, as described in reference to FIG. 2. PCA has the effect of reducing the dimension of datasets without significantly distorting spatial variation of the data points. The W matrix can be different for the high and low variance feature sub-vectors, e.g., when there are different numbers of high and low variance features.

The low variance anomaly event detection model 122 and the high variance anomaly event detection model 124 receive dimension reduced low and high variance features from the PCA model 120 respectively. Each of the low variance anomaly event detection model 122 and high variance anomaly event detection model 124 comprise cluster centers, cluster labels, and can further comprise cluster statistics. Each cluster can be labelled as "normal" for corresponding to normal behavior, "benign" for corresponding to non-typical but non-malicious user behavior, and "malicious" for corresponding to malicious user behavior. Each of the models 122 and 124 receive the respective dimension-reduced feature vectors and determine whether the dimension-reduced feature vectors are sufficiently close to a cluster center for a cluster labelled "normal" or "benign" to be classified as non-anomalous, whether the dimension-reduced feature vectors are too far from a "normal" or "benign" cluster to be classified as anomalous, and/or whether the dimension-reduced feature vectors are close enough to a "malicious" cluster to be classified as anomalous. For instance, the models 122 and 124 can store the median and standard deviation of distances from each cluster center, and if the dimension-reduced feature vectors are more than one standard deviation away from the mean distance from every "normal" and "benign" cluster center, then they are classified as anomalous.

Once a per-user feature vector is classified as anomalous, the risk score analyzer 126 evaluates a risk score to associate with the corresponding anomalous event. The risk score analyzer 126 can maintain risk scores associated with feature(s) and can weight the risk score against the statistical deviation of the flagged feature from the baseline to increment a net risk score for the user. For instance, if the risk score weight for the associated feature(s) is $r_i$, then the risk score can be incremented by $r_i$. Risk score weights $r_i$ can vary by feature(s) and can be larger for low variance features to reflect the increased risk when a feature that is unlikely to change experiences a change. Other ways to increment the risk score can be implemented. The risk score associated with feature(s) can be updated during training cycles and can be determined using domain-level expert knowledge of relative importance for specific features (i.e., that an increase in SaaS application usage is significantly less important than geographic location of access half the world away, that certain SaaS applications are risk-averse, etc.). To avoid indefinitely incrementing the risk score until it reaches an alert threshold, score decay can be implemented. For example, the risk score analyzer 126 can decrement the risk score for each user according to a schedule (e.g., decrement the risk score to zero every week, decrement risk score by 20% every day, etc.).

If the risk score analyzer 126 determines that the risk score exceeds a threshold risk score for triggering an alert, the risk score analyzer 126 generates an event alert to add to anomalous event alerts 119A. The risk score analyzer 126 can dump any relevant capture files and/or firewall logs from the firewall database 160 to add to the anomalous event alerts 119A for analysis by a domain-level expert managing user security. The risk score analyzer 126 can additionally analyze previous anomalous events for the corresponding user to determine any other events to include in the alert (e.g., events corresponding to feature values that statistically deviate from a baseline of previously detected anomalous feature vectors), as well as a severity of the alert that can depend on the net risk score for the user and/or types of anomalous events.

At stage D, once the profile update time boundary is reached (i.e., at the end of time interval t), the anomaly detector 106 updates the behavioral profiles 116A and 118A which generates behavioral profiles 116B and 118B. The anomaly detector 106 stores capture files 117A recorded during time interval t and uses the feature pre-processor 109 and PCA model 120 and performs preprocessing steps so that the capture files 117A can be used for anomaly detection model updates. Additionally, the anomaly detector 106 retrieves dimension-reduced feature vectors stored for previous time intervals for training, and discards dimension-reduced feature vectors from the oldest stored time interval so that the current training set corresponds to a sliding window of time intervals (e.g., last 10 time intervals). In some embodiments where data storage is readily available, training data for all previous time intervals can be stored. The anomaly detector 106 updates the dimension-reducing transformation for PCA models in the behavioral profiles 116A and 118A using the updated training set and retrains the low variance anomaly event detection model 122 and the high variance anomaly event detection model 124 on the dimension-reduced, updated training set using, for instance, k-nearest neighbors clustering. The updated models are added to the updated behavioral profiles 116B and 118B. Training operations involving the updated training set are described in greater detail with reference to FIG. 2. During training, behavioral profiles 116A and 118A can remain deployed for packet analysis at the beginning of time interval t+1 until updated behavioral profiles 116B and 118B are ready for deployment.

The operations at stages E, F, and G occur similarly to operations at stages A, B, C with the exception that they occur with updated behavioral profiles at time interval t+1. The packet analyzer 107 generates new capture files 117B from new connections 1B and 2B, resulting in new per-user feature vectors 114B and 115B. The new per-user feature vectors 114B and 115B are evaluated by updated behavioral profiles 116B and 118B, and any anomalous events are used to increment risk scores that, when evaluated by risk score analyzers on the updated behavioral profiles 116B and 118B, trigger the generation of anomalous event alerts 119B.

The behavioral profiles and features in FIG. 1 are depicted for individual users. In some embodiments, features and/or profiles are generated at multiple behavioral scopes across users. For instance, certain features can be generated across an organization. Separate profiles can be maintained for each organization. The database 160 can index its logs by organization for efficient querying. When event alerts are generated for an organization, the anomaly detector 106 can investigate individual users within the organization that triggered the alert to determine any compromised user(s) and generate further alerts for individual users. While the low variance anomaly event detection model 122 and high variance anomaly event detection model 124 as well as other anomaly detection models are described in embodiments as clustering models, these can be any outlier detection models e.g., local outlier factor models, one class support vector machines, hidden Markov models, etc. Moreover, other dimensionality reduction techniques than PCA can be implemented, and if operational costs allow, the dimension reduction step can be omitted altogether.

Figure 2:
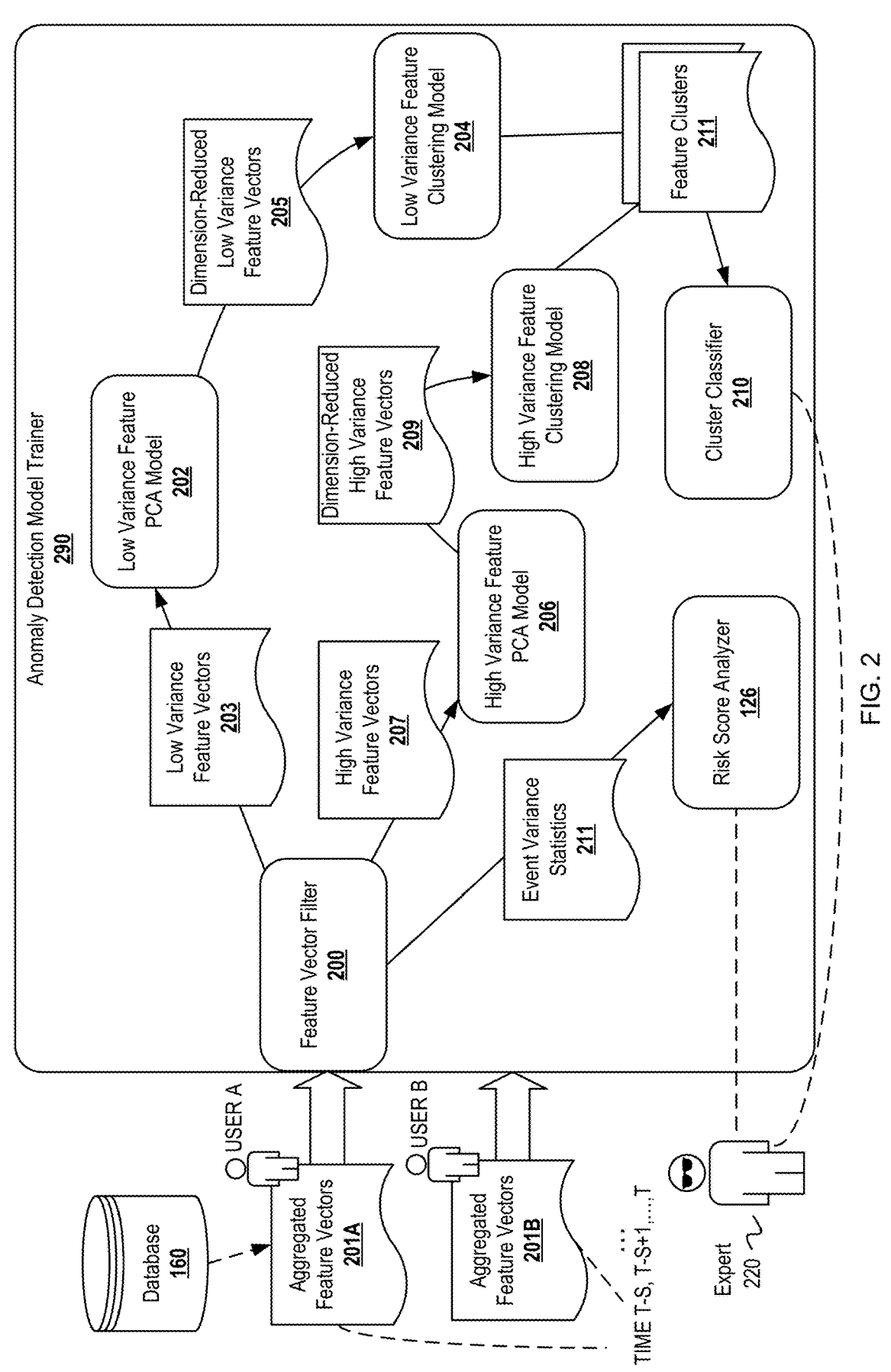
FIG. 2 is a schematic diagram for training per-user high and low variance event clustering models for anomaly detection in network traffic.

FIG. 2 is a schematic diagram for training per-user high and low variance event clustering models for anomaly detection in network traffic. A packet analyzer (not depicted in FIG. 2) adds network traffic intercepted/analyzed during time interval t to the database 160, and an anomaly detector (also not depicted in FIG. 2) queries the database 160 to generate aggregated feature vectors 201A for user A, aggregated feature vectors 201B for user B, etc. The aggregated feature vectors 201A are generated from preprocessing of capture files for data packets analyzed by the packet analyzer in traffic for user A. The aggregated feature vectors 201A comprise feature vectors from the previous time interval t−s, t−s+1, . . . , t. In some embodiments, the packet analyzer 107 discards feature vectors from the t−s−1 time interval (and all previous time intervals) to maintain a sliding window of features comprising s+1 time intervals. The anomaly detection model trainer 290 applies the operations depicted in FIG. 2 to every user, organization, etc. for which feature vectors are being aggregated and anomaly detection models are being maintained.

A feature vector filter 200 filters the aggregated feature vectors 201A into low variance feature vectors 203 which correspond to events that do not change significantly over time and high variance feature vectors 207 that change significantly over time. The packet analyzer 107 or other component of a security appliance or security service not depicted also collects event variance statistics 211 for events in network traffic during time intervals in the sliding window. The feature vector filter 200 communicates the event variance statistics 211 to the risk score analyzer 126. The risk score analyzer 126 has running statistics for each feature corresponding to a type of event and can update these running statistics to establish a statistical baseline when classifying anomalous events. The risk score analyzer 126 can update the statistics to only run over a set number of previous time intervals (e.g., 10). To exemplify, the risk score analyzer 126 can store separate values for feature mean, variance, etc. during each time interval and can discard statistics for the oldest time interval when calculating the current running statistics. The risk score analyzer 126 can use these statistics to update the feature vector filter 200 when features are reclassified as low variance or high variance (e.g., when the running statistical variance for a feature goes above or below a threshold for low/high variance classification). An expert 220 can analyze features to determine whether each feature is low or high variance and can manually adjust risk score weights for each feature based on domain level expertise. For instance, if users running SaaS applications experience an increased number of compromised logins in remote geolocations, the expert 220 can increase the risk score for the geolocation of access feature.

A low variance feature PCA model 202 receives the low variance feature vectors 203 and a high variance feature PCA model 206 receives the high variance feature vectors 207. The low variance feature PCA model 202 and high variance feature PC model 206 learn dimension reducing transformations that minimize spatial distortion of the corresponding feature vectors. For instance, if there are n features for the low variance feature vectors 203, p feature vectors, the feature vectors are in an n by p matrix X, and the feature vectors are being reduced to dimension m, then the PCA transformation W can be computed by taking the singular value decomposition $X=U\Sigma V''$, and then computing $W=X^{-1}U_m\Sigma_m$, where $U_m\Sigma_m$ truncates the singular value matrix $\Sigma$ to the first m singular values. Other methods for dimensionality reduction can be used. Note that the matrix $T=U_m\Sigma_m$, is the dimension reduced version of the low variance feature vectors 203 and that the W matrix is only needed for reducing the dimension of additional feature vectors once the anomaly detection models are deployed. The low variance feature PCA model 202 and high variance feature PCA model 206 reduce the dimension of low variance features 203 and high variance features 207 and communicate dimension-reduced low variance feature vectors 205 and dimension-reduced high variance feature vectors 209 to a low variance feature clustering model 204 and high variance feature clustering model 208, respectively.

The low variance feature clustering model 204 and high variance feature clustering model 208 apply a clustering algorithm in the dimension reduced space (dimension m in the example above) such as k-means clustering, density-based spatial clustering of applications with noise, hierarchical clustering, etc. A cluster classifier 210 receives feature clusters 211 generated by the low variance feature clustering model 204 and the high variance feature clustering model 208. Each cluster comprises coordinates for a cluster center, statistics for each cluster such as number of data points, mean distance from cluster center, standard deviation of distances from cluster center, etc. The cluster classifier 210 classifies each cluster as normal or abnormal. For instance, the expert 220 can manually inspect each cluster to make such a decision or the cluster classifier 210 can be a trained classifier (e.g., a machine learning model). In some embodiments, the cluster classifier 210 can determine whether abnormal clusters are malicious or benign. The cluster classifier 210 includes the clusters (center coordinates and cluster statistics) as well as the labels when deploying clustering models for anomaly detection in a behavioral profile. The deployed cluster models classify features as anomalous for failing to belong to a cluster or for belonging to a malicious cluster.

Figure 3:
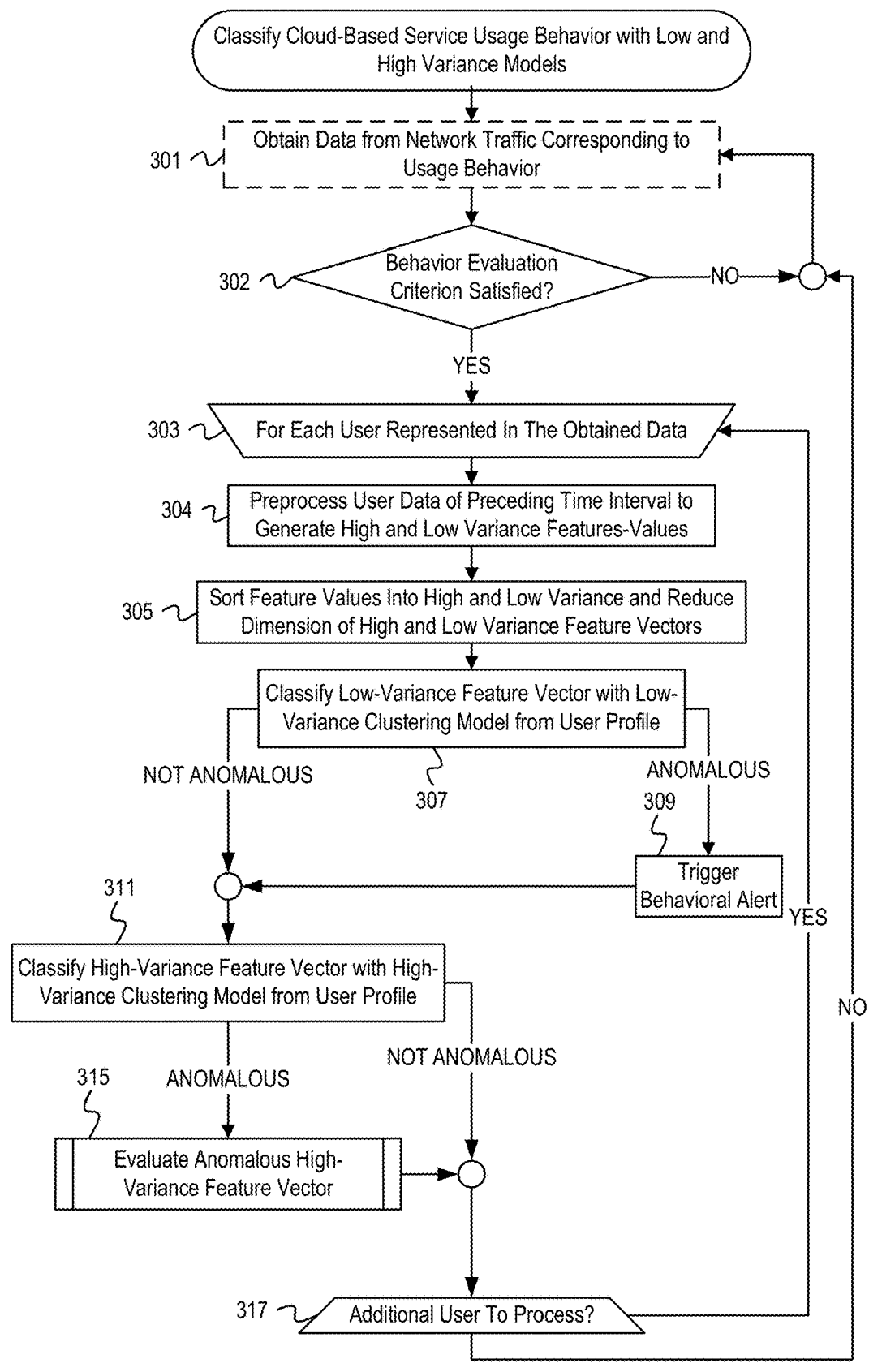
FIG. 3 is a flowchart of example operations for classifying cloud-based service usage behaviors with high and low variance models.
Figure 4:
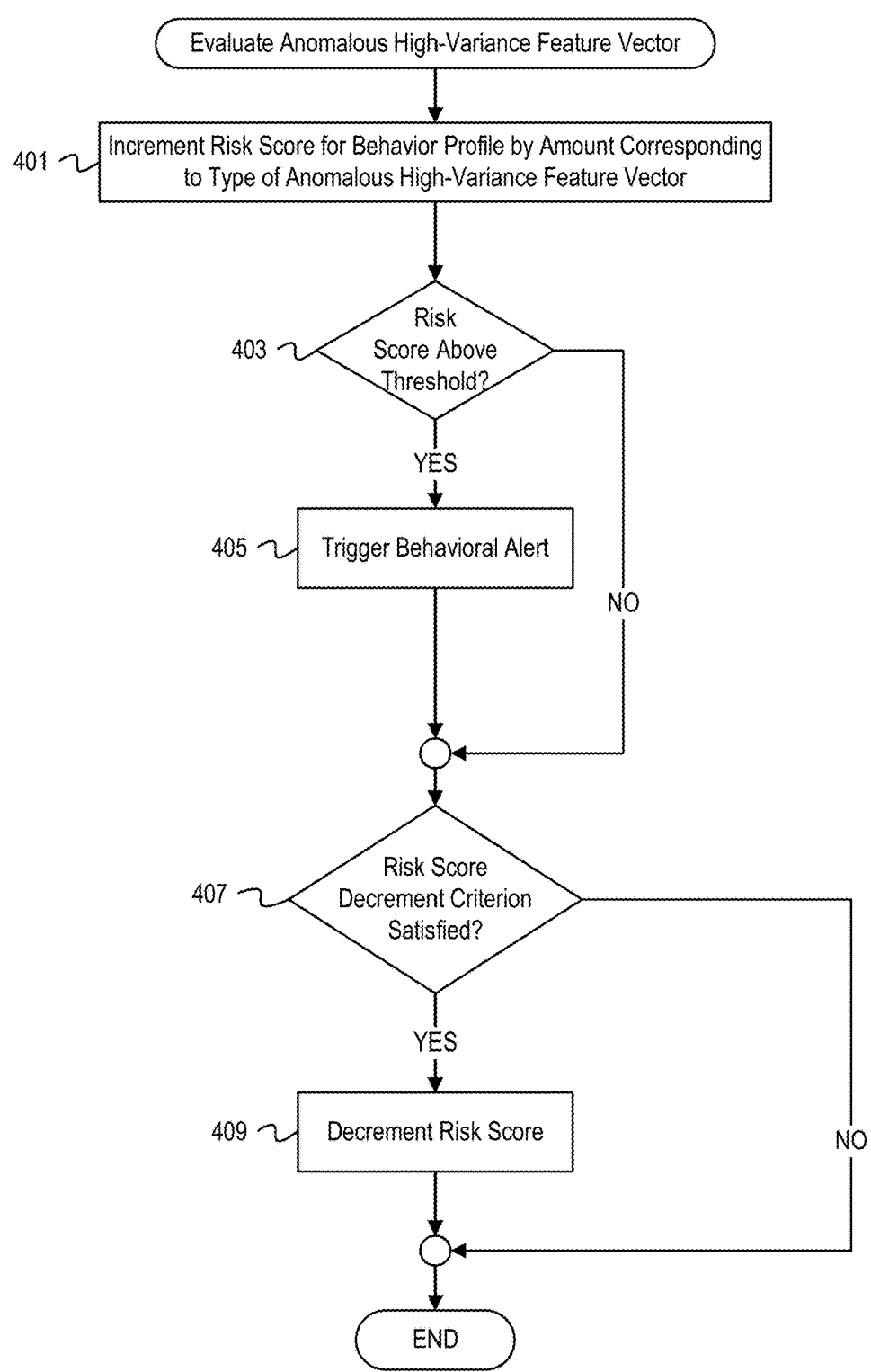
FIG. 4 is a flowchart of example operations for evaluating an anomalous high variance feature vector.
Figure 5:
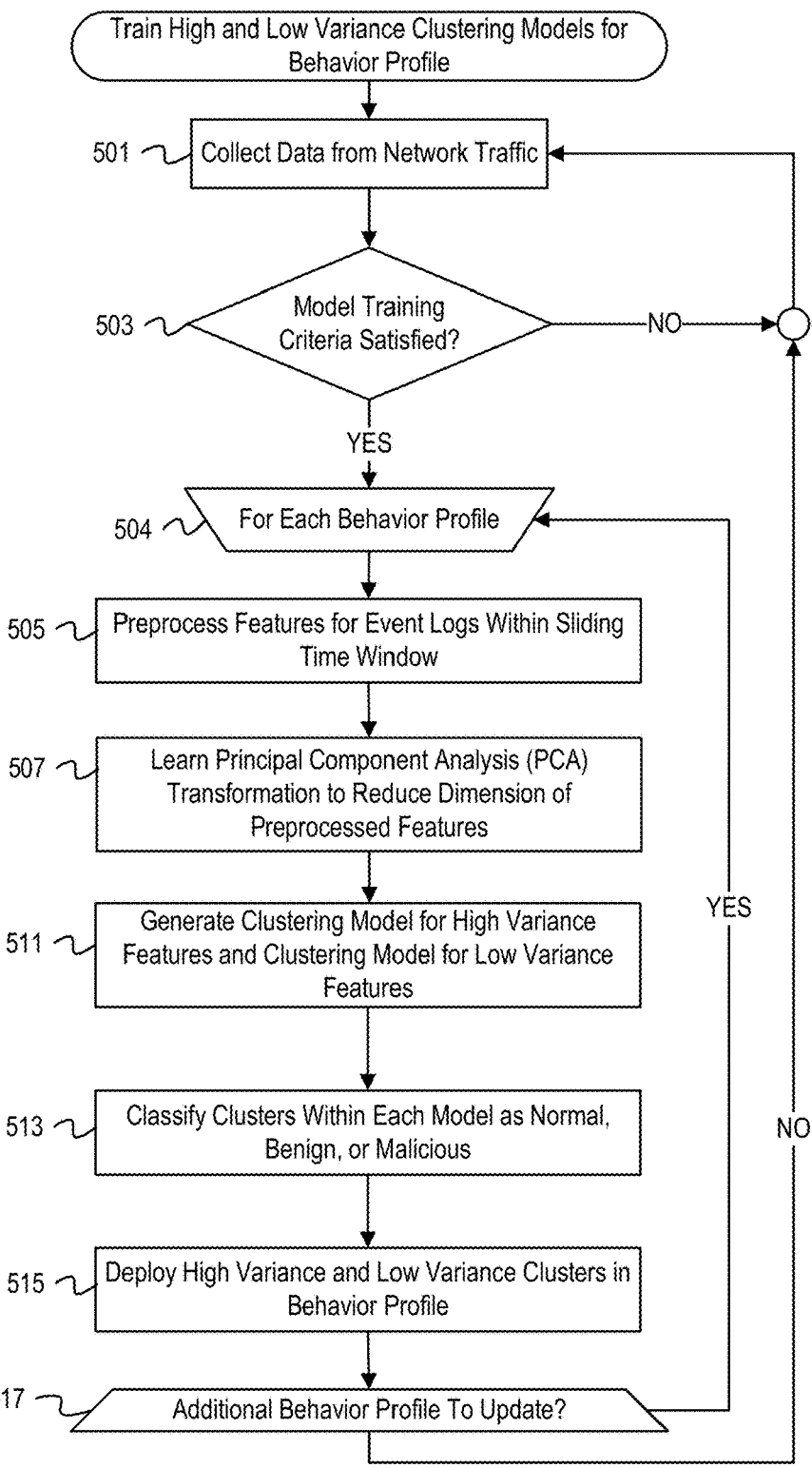
FIG. 5 is a flowchart of example operations for training high and low variance clustering models for implementation in a behavior profile for detection of anomalous user behavior.

FIGS. 3-5 are flowcharts of example operations that explain the disclosed technology in a programmatic flow paradigm to provide another perspective. While descriptions of the example operations refer to named actors (e.g., anomaly detector) for consistency with the earlier figures, the name(s) used is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for classifying cloud-based service usage behaviors with high and low variance models. Behavior related to Anything-as-a-Service (XaaS) delivered from a cloud architecture is determined or represented by data extracted from network traffic. Classifying usage behavior is essentially classifying network traffic data indicative of usage behavior. The example operations refer to an anomaly detector performing the operations. The programmatic flow depicted in FIG. 3 presumes an ongoing monitoring service type of deployment, for example a cloud-based security service, that continues monitoring network traffic unless interrupted by an external command or interrupt.

At block 301, an anomaly detector obtains, from network traffic, data that corresponds to usage behavior. Block 301 is depicted in a dashed line because the anomaly detector does not necessarily capture the data. For instance, obtaining the data may involve generating and storing packet capture files and security appliance (e.g., firewall) logs. The generating and storing of firewall logs can be performed independent of the anomaly detector, and the repository of firewall logs and capture files is accessible to the anomaly detector. For instance, a packet analyzer may generate capture files and a firewall can access the capture files and generate features such as malicious verdicts based on analyzing one or more capture files. Even though the anomaly detector may not generate and store the data extracted from network traffic, the anomaly detector may create a different instance of the dataset or organize the data according to how the anomaly detector will consume the data. For instance, the network traffic data may be arranged in a repository by flow, sessions, or network addresses. The anomaly detector may organize or mark/tag the data according to a scope of analysis to be applied by the anomaly detector (e.g., department level, user level, etc.). The anomaly detector may index capture files by events, by user sessions, by user logins, etc. Embodiments may delete stored log files and/or firewall generated features prior to a sliding time window for memory efficiency. This data accumulation and possible maintenance continues until an external trigger stops the process and the operations depicted in FIG. 3 terminate, e.g., when a user/organization account is deleted, when the database runs out of storage, etc.

At block 302, the anomaly detector determines whether a behavior evaluation criterion is satisfied. The criterion can be according to a fixed schedule (e.g., every day), can be manually triggered, can occur in response to increased risk for a specific usage behavior scope (e.g., department scope or user scope) or SaaS applications, etc. If the criterion is satisfied, operations proceed to block 303. Otherwise, operations return to block 301.

At block 303, the anomaly detector begins processing the obtained network traffic data of each user represented in the obtained data. The anomaly detector can traverse the obtained data in order of represented users if the data has been organized by user. Otherwise, the anomaly detector may make multiple passes over the obtained data.

At block 304, the anomaly detector preprocesses user data of the previous time interval of anomalous behavior detection to generate feature-values. The anomaly detector queries the database hosting the user data for extracted data for the user over the preceding anomaly detection time interval (e.g., the previous day) based on a set of predetermined features corresponding to types of events. For instance, the anomaly detector can query the database for user logins and logouts over the previous day, volume of user traffic corresponding to each SaaS application over the previous day, types of operating systems run by the user over the previous day, etc. The anomaly detector converts alphabetical features (e.g., operating systems) to numerical features using, for instance, word2vec and normalizes the numerical features (e.g., so that they have mean zero and variance one).

At block 305, the anomaly detector sorts the feature values by high and low variance features and reduces the dimension of high and low variance feature vectors comprising feature-values of high and low variance features, respectively. The anomaly detector can have an index indicating each feature as high or low variance. This index can be dynamically updated during training of anomaly detection models. The anomaly detector can initialize high and low variance feature vectors then iterate through each feature value and add them to the corresponding feature vector based on the index. In other embodiments, feature values are automatically sorted into high and low variance feature vectors during preprocessing as the feature values are generated. An indicator for whether each feature is high or low variance can be a hyperparameter passed in a function that generates feature values for each feature that determines where to send the function output. Once the high and low variance feature vectors are generated, the anomaly detector reduces the dimension of the low variance feature vector the high variance feature vector using PCA transformations (i.e., one PCA transformation for low variance features, one PCA transformation for high variance features) generated during training.

At block 307, the anomaly detector classifies the low variance (dimension reduced) feature vector with a low variance clustering model from a behavior profile for the user. The anomaly detector determines whether the low variance feature vector is sufficiently close (e.g., with 2 standard deviations) from a "normal" or "benign" cluster center in the low variance clustering model. If the low variance feature vector is sufficiently close to a normal or benign cluster, then the anomaly detector classifies the low variance feature vector as non-anomalous. Otherwise, the anomaly detector classifies the low variance feature vector as anomalous. Replace user with behavior profiles If the feature vector was classified as anomalous, operations continue to block 309. Otherwise, operations proceed to block 311.

At block 309, the anomaly detector triggers a behavioral alert for the user. In some embodiments, the anomaly detector can maintain a risk score for low variance features and instead of automatically triggering a behavioral alert, can increment the risk score until the risk score exceeds a threshold, which then triggers an alert. This risk score can correspond to low and high variance features or can be maintained separately with distinct thresholds for low variance features and high variance features. The alert can comprise capture files and firewall logs dumped from the user (e.g., by accessing a database) over a time period corresponding to the alert, e.g., the period since the behavior evaluation criterion was last satisfied.

At block 311, the anomaly detector classifies the high variance (dimension reduced) feature vector with a high variance clustering model from a behavior profile for the user. The anomaly detector determines whether the high variance feature vector is sufficiently close (e.g., with 2 standard deviations) from a "normal" or "benign" cluster center in the high variance clustering model. If the high variance feature vector is sufficiently close to a normal or benign cluster, then the anomaly detector classifies the high variance feature vector as non-anomalous. Otherwise, the anomaly detector classifies the high variance feature vector as anomalous.

At block 315, the anomaly detector evaluates the anomalous high variance feature vector. The evaluation may lead to triggering of an alert or updating a risk score. The operations at block 315 are described in greater detail with respect to FIG. 4.

After classification of the high and low variance feature vectors of the user with the high and low variance models in the behavior profiles of the user, operations proceed to block 317. At block 317, the anomaly detector determines whether there is an additional user represented in the obtained data to process. If so, operational flow returns to block 303. Otherwise, operational flow returns to block 301.

FIG. 4 is a flowchart of example operations for evaluating an anomalous high variance feature vector. Due to the high variance behavior, a high variance feature vector classified as anomalous does not necessarily warrant an alert. Maintaining a risk score across behavior evaluation intervals can allow for the variance in high variance behavior while tempering the corresponding risk with the risk score. In some embodiments, the operations depicted in FIG. 4 can equivalently be performed for low variance feature vectors.

At block 401, an anomaly detector increments a risk score for a behavior profile by an amount corresponding to a type of anomalous high variance feature vector. For instance, feature vectors for features of SaaS application usage having high associated risks can increment the risk score a greater amount than features for lower risk SaaS application usage. As with the behavior profiles, the risk score can be maintained at different scopes—per-user, per-organization, etc. Risk scores can be stored in a database and indexed by feature, by feature and per-user, by feature and per-organization, etc. Amounts to increment the risk score corresponding to different types of high variance feature vectors can be determined by a domain-level expert and can be dynamically updated according to corresponding scopes for risk scores based on changes in the security landscape, such as exposure of certain SaaS applications to emerging threats.

At block 403, the anomaly detector determines whether the risk score exceeds a threshold. The threshold risk score can also be maintained by a domain level expert using historical user security trends and can be specific to a behavior profile, an organization, etc. If the risk score exceeds the threshold, operations proceed to block 405. Otherwise, operations skip to block 407.

At block 405, the anomaly detector triggers a behavioral alert for the user. The alert can be triggered both for the user and for any organizations associated with the user that may be at increased exposure to corresponding malicious activity. The anomaly detector can dump capture files of the user's SaaS application traffic and firewall logs for the time period corresponding to the behavioral alert into a report for the alert.

At block 407, the anomaly detector determines whether risk score decrement criterion is satisfied. The decrement criteria can be according to a schedule (e.g., every week). In addition or alternatively, the decrement criteria can be satisfied immediately after a behavioral alert is triggered for the corresponding user. If the decrement criteria are satisfied, operations proceed to block 409. Otherwise, the operations in FIG. 4 terminate.

At block 409, the anomaly detector decrements the risk score. The amount to decrement the risk score can depend on which corresponding risk score decrement criteria were satisfied. For instance, when the decrement criteria are according to a weekly schedule, the decrement can be percentage-based (e.g., reduce risk score by 10%). When the decrement criteria are that a behavioral alert was triggered, the risk score can be reset to 0.

FIG. 5 is a flowchart of example operations for training high and low variance clustering models for implementation in a behavior profile for detection of anomalous user behavior.

At block 501, an anomaly detection model trainer collects data from network traffic. As previously mentioned, the data collection may be performed by a separate entity that stores the collected data at a location(s) accessible to the anomaly detector trainer. The anomaly detector may organize the collected data and/or process the collected data into a structure and/or add metadata for the collected data to be more conducive for model training.

At block 503, the anomaly detection model trainer determines whether model training criteria are satisfied. The model training criteria can be according to a schedule (e.g., every week, every month, etc.) and can be dynamically updated based on the current security landscape. For instance, when domain level experts detect new malware threats that expose SaaS applications being run by the user, expose organizations associated with the user, etc. the domain level experts can indicate that the model training criteria is satisfied so that models are retrained to detect these new malware threats. If the model training criteria are satisfied, operations proceed to block 504. Otherwise, operations return to block 501.

At block 504, the anomaly detection model trainer begins processing each behavior profile. An organization may maintain a behavior profile at a single scope or at multiple scopes. A behavior profile may be added, merged, retired, etc. For instance, a behavior profile can be added for a new user but remain inactive until the models of the behavior profile are sufficiently trained. Alternatively, a new user may be assigned to a template behavior profile that is adapted to the user's behavior through training.

At block 505, the anomaly detection model trainer preprocesses features from collected data corresponding to the behavior profile within a sliding time window. The anomaly detection model trainer queries a database with indication of the behavior profile, event type, and time frame. Indication of the behavior profile will depend upon the scope. For example, the behavior profile indication can be a user identifier or a department identifier. The database returns corresponding capture files and firewall logs. For instance, the event type can be SaaS traffic volume, and the anomaly detection model trainer can query the database for logs of SaaS traffic volume over the past n time intervals (e.g., 10 time intervals), wherein each time interval comprises the previous window of time since the models were last retrained (this is determined by the model training criteria but can be, for instance, a week). The anomaly detection model trainer preprocesses any capture logs and/or firewall logs returned by the database into features-values. The features-values are processed in shorter time intervals corresponding to how often the deployed anomaly detection models are used for anomaly detection. For instance, the deployed low and high variance models will detect user anomalies every day and the training data will comprise logs from the past 10 weeks, so that each day from the past 10 weeks will be used to generate a feature vector (e.g., 70 feature vectors). For feature generation, the anomaly detection model trainer can, for instance, convert alphabetical features to numerical features and normalize the statistics for each feature.

At block 507, the anomaly detection model trainer learns a PCA transformation to reduce the dimension of the preprocessed features. The anomaly detection model trainer separates each feature vector into a vector of low variance features and a vector of high variance features and learns a separate PCA transformation for the high variance features and the low variance features; the choice of reduced dimension can vary. In both instances, the PCA transformation can be learned by taking the singular value decomposition (SVD) of the matrix of training data (i.e., the matrix of low variance feature vectors and the matrix of high variance feature vectors) and truncating the matrix of singular values in the SVD based on the desired reduced dimension. This gives the dimension reduced training data, and the transformation matrix can be computed using matrix inversion as described above.

At block 511, the anomaly detection model trainer generates a clustering model for the high variance features and a clustering model for the low variance features. The anomaly detection model trainer applies a clustering algorithm such as k-means, hierarchical clustering, etc. to the dimension reduced high variance feature vectors and the clustering algorithm (or another clustering algorithm) to the dimension reduced low variance feature vectors. The clustering models can vary with respect to the type of algorithm used and initialization parameters (e.g., the initial number of clusters and initial choice of cluster centers). The anomaly detection model trainer stores cluster centers for the high and low variance clustering models as well as cluster statistics to be used for anomaly (i.e., outlier) detection.

At block 513, the anomaly detection model trainer classifies clustering within the low variance and high variance clustering models as normal, benign, or malicious. The normal clusters are determined using historical patterns of user behavior for non-malicious user activity and can be classified using domain-level expertise. Benign and malicious clusters fall outside of historical patterns of (non-anomalous) user behavior, and malicious clusters are identified from the set of clusters that don't adhere to these historical patterns by instead associating historical patterns of malicious activity or a malicious actor with the pattern of behavior in each cluster. To exemplify, these patterns of historical activity can be identified from capture and firewall logs for a user, for instance historical traffic volume for certain SaaS applications. Then, the traffic volume for each SaaS application for the user can be compared to traffic volume indicated in capture files corresponding to feature vectors within each cluster (i.e., capture files that were used to generate each feature vector via preprocessing and PCA transformation). Clusters indicating SaaS application traffic volume that deviates from user patterns can be compared to known malicious traffic patterns for the corresponding SaaS applications and, if conforming to these patterns, clusters are classified as malicious (and otherwise classified as benign).

At block 515, the anomaly detection model trainer deploys the high and low variance clusters in the behavior profile. Deployment may be replacing the models that currently form the behavior profile. The high and low variance clusters are used for anomaly detection by querying a database for collected/extracted network traffic user data (e.g., capture files and firewall logs) over a prescribed time period (e.g., a day) corresponding to the time period over which the feature vectors were generated during the training process. The capture files and firewall logs for the user during that time period are then used to generate a feature vector for recent user behavior that are compared to cluster centers within each of the high and low variance clusters. If either of the feature vectors statistically deviates from cluster centers of normal and benign clusters (and/or is sufficiently close to a malicious cluster), then a risk score can be incremented and/or a behavioral alert triggered.

At block 517, the anomaly detection model training determines whether there is another behavior profile to update. If there is an additional behavior profile to update, operational flow returns to block 504 for the next behavior profile. Otherwise, operational flow returns to block 501 for continued data collection. Depending upon scale of the behavior profiles (e.g., thousands of users or several departments) and available resources, the training can be distributed across computing resources and conducted in parallel. Likewise, applying the profiles for anomaly detection can also be distributed/in parallel.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 307 and 311 can be performed in parallel or concurrently. With respect to FIG. 4, decrementing the risk score is not necessary. While seemingly sequential from the depiction in FIGS. 3 and 5, data collection can continue during model training. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
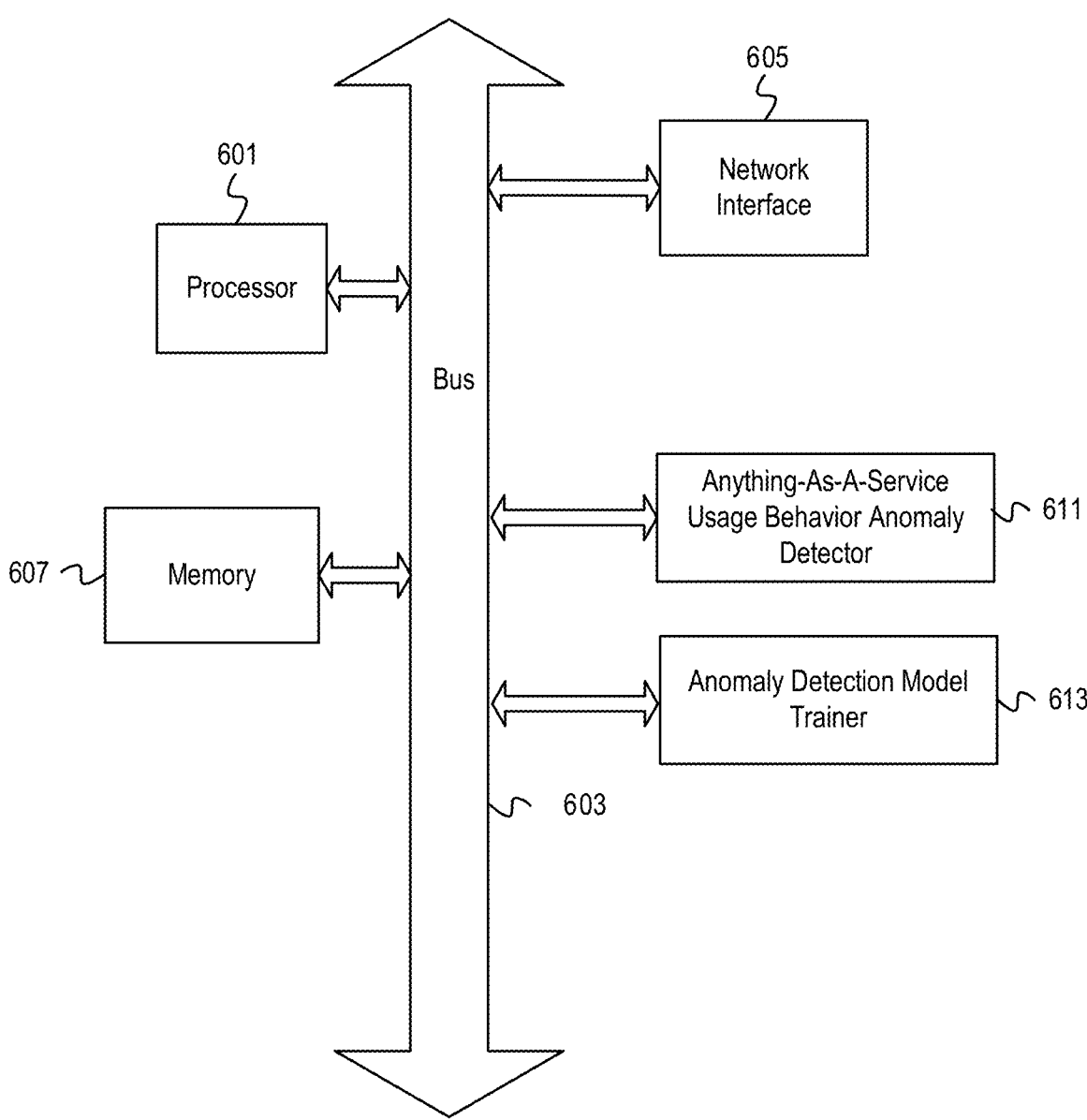
FIG. 6 depicts an example computer system with an XaaS anomaly detector and an anomaly detection model trainer.

FIG. 6 depicts an example computer system with an XaaS anomaly detector and an anomaly detection model trainer. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes XaaS usage behavior anomaly detector 611 and anomaly detection model trainer 613. The XaaS usage behavior anomaly detector 611 is run to detect anomalous user behavior with usage behavior profiles comprising high and low variance clustering models. The anomaly detection model trainer 613 can train the high and low variance clustering models using PCA and clustering of feature vectors generated from capture files and firewall logs for a behavioral scope as described variously above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for anomaly detection of user behavior for SaaS application traffic with high and low variance detection models as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

at least one of identifying a first feature as low variance that was previously identified as high variance and identifying a second feature as high variance that was previously identified as low variance based, at least in part, on statistics for feature values generated from network traffic data in a sliding window of time intervals for features identified as high variance features and features identified as low variance features, wherein the sliding window of time intervals precedes a current time interval;

determining, from network traffic data of a first user and of the current time interval, feature values corresponding to Anything-as-a-Service usage behavior of the first user;

generating a first feature vector with a first subset of the feature values corresponding to the features identified as high variance features and a second feature vector with a second subset of the feature values corresponding to the features identified as low variance features;

inputting the first feature vector into a low variance clustering model for a first behavioral scope associated with the first user and the second feature vector into a high variance clustering model for the first behavioral scope, wherein the low variance clustering model and the high variance clustering model comprise clusters that were generated with one or more clustering algorithms, wherein the low variance clustering model and the high variance clustering model output classifications of user behavior based on proximity of feature vectors to clusters of low and high variance feature vectors, respectively, labeled as normal or abnormal, and wherein the high and low variance clustering models are repeatedly trained with the network traffic data in the sliding window of time intervals preceding the current time interval; and indicating detection of anomalous behavior for the first user based, at least in part, on output of the high and low variance clustering models.

2. The method of claim 1, further comprising incrementing a risk score for the first user based on at least one of the high and low variance clustering models generating outputs comprising indications of anomalous behavior for the first user.

3. The method of claim 2, wherein the risk score is incremented by an amount based, at least in part, on risk associated with features corresponding to inputs to the high and low variance clustering models for outputs comprising the indications of anomalous behavior for the first user.

4. The method of claim 2, further comprising generating an alert indicating anomalous behavior for the first user based, at least in part, on the risk score for the first user exceeding a threshold risk score.

5. The method of claim 1, wherein the first behavioral scope comprises a scope of network traffic data for at least the first user used to train the high and low variance clustering models.

6. The method of claim 1, wherein the one or more clustering algorithms comprise at least one of k-means clustering, density-based spatial clustering of applications with noise, and hierarchical clustering.

7. The method of claim 1, further comprising adjusting risk score weights for the features identified as high variance and the features identified as low variance.

8. A non-transitory machine-readable medium having program code stored thereon, the program code comprising instructions to:

at least one of identify a first feature as low variance that was previously identified as high variance and identify a second feature as high variance that was previously identified as low variance based, at least in part, on statistics for feature values generated from network traffic data in a sliding window of time intervals for features identified as high variance features and features identified as low variance features, wherein the sliding window of time intervals precedes a current time interval;

determine, from network traffic data of a first user and of the current time interval, feature values corresponding to Anything-as-a-Service usage behavior of the first user;

generate a first feature vector with a first subset of the feature values corresponding to the features identified as high variance features and a second feature vector with a second subset of the feature values corresponding to the features identified as low variance features;

input the first feature vector into a low variance clustering model for a first behavioral scope associated with the first user and the second feature vector into a high variance clustering model for the first behavioral scope, wherein the low variance clustering model and the high variance clustering model comprise clusters that were generated with one or more clustering algorithms, wherein the low variance clustering model and the high variance clustering model output classifications of user behavior based on proximity of feature vectors to clusters of low and high variance feature vectors, respectively, labeled as normal or abnormal, and wherein the high and low variance clustering models are repeatedly trained with the network traffic data of the sliding window of time intervals preceding the current time interval; and indicate detection of anomalous behavior for the first user based, at least in part, on output of the high and low variance clustering models.

9. The non-transitory machine-readable medium of claim 8, wherein the program code further comprises instructions to increment a risk score for the first user based on at least one of the high and low variance clustering models generating outputs comprising indications of anomalous behavior for the first user.

10. The non-transitory machine-readable medium of claim 9, wherein the risk score is incremented by an amount based, at least in part, on risk associated with features corresponding to inputs to the high and low variance clustering models for outputs comprising the indications of anomalous behavior for the first user.

11. The non-transitory machine-readable medium of claim 9, wherein the program code further comprises instructions to generate an alert indicating anomalous behavior for the first user based, at least in part, on the risk score for the first user exceeding a threshold risk score.

12. The non-transitory machine-readable medium of claim 8, wherein the first behavioral scope comprises a scope of network traffic data for at least the first user used to train the high and low variance clustering models.

13. The non-transitory machine-readable medium of claim 8, wherein the one or more clustering algorithms comprise at least one of k-means clustering, density-based spatial clustering of applications with noise, and hierarchical clustering.

14. The non-transitory machine-readable medium of claim 8, wherein the program code further comprises instructions to adjust risk score weights for the features identified as high variance and the features identified as low variance.

15. An apparatus comprising:

a processor; and a machine-readable medium having instructions stored thereon that are executable by the processor to cause the apparatus to, at least one of identify a first feature as low variance that was previously identified as high variance and identify a second feature as high variance that was previously identified as low variance based, at least in part, on statistics for feature values generated from network traffic data in a sliding window of time intervals for features identified as high variance features and features identified as low variance features, wherein the sliding window of time intervals precedes a current time interval;

determine, from network traffic data of a first user and of the current time interval, feature values corresponding to Anything-as-a-Service usage behavior of the first user;

generate a first feature vector with a first subset of the feature values corresponding to the features identified as high variance features and a second feature vector with a second subset of the feature values corresponding to the features identified as low variance features;

input the first feature vector into a low variance clustering model for a first behavioral scope associated with the first user and the second feature vector into a high variance clustering model for the first behavioral scope, wherein the low variance clustering model and the high variance clustering model comprise clusters that were generated with one or more clustering algorithms, wherein the low variance clustering model and the high variance clustering model output classifications of user behavior based on proximity of feature vectors to clusters of low and high variance feature vectors, respectively, labeled as normal or abnormal, and wherein the high and low variance clustering models are repeatedly trained with the network traffic data of the sliding window of time intervals preceding the current time interval; and indicate detection of anomalous behavior for the first user based, at least in part, on output of the high and low variance clustering models.

16. The apparatus of claim 15, wherein the machine-readable medium further has stored thereon instructions executable by the processor to cause the apparatus to increment a risk score for the first user based on at least one of the high and low variance clustering models generating outputs comprising indications of anomalous behavior for the first user.

17. The apparatus of claim 16, wherein the risk score is incremented by an amount based, at least in part, on risk associated with features corresponding to inputs to the high and low variance clustering models for outputs comprising the indications of anomalous behavior for the first user.

18. The apparatus of claim 16, wherein the machine-readable medium further has stored thereon instructions executable by the processor to cause the apparatus to generate an alert indicating anomalous behavior for the first user based, at least in part, on the risk score for the first user exceeding a threshold risk score.

19. The apparatus of claim 15, wherein the first behavioral scope comprises a scope of network traffic data for at least the first user used to train the high and low variance clustering models.

20. The apparatus of claim 15, wherein the one or more clustering algorithms comprise at least one of k-means clustering, density-based spatial clustering of applications with noise, and hierarchical clustering.

* * * * *